US005897024A

United States Patent [19]

Coughlin et al.

[11] Patent Number: 5,897,024

[45] Date of Patent: Apr. 27, 1999

[54] MEDICAMENT DISPENSING CELL

[75] Inventors: Michael E. Coughlin; Claire P. Coughlin, both of Overland Park; Lawrence E. Guerra, Roeland Park; Keith W. Kudera, Merriam, all of Kans.

[73] Assignee: Scriptpro LLC, Mission, Kans.

[21] Appl. No.: 08/897,727

[22] Filed: Jul. 21, 1997

[51] Int. Cl.[6] .................... B65G 49/00

[52] U.S. Cl. .................... 221/135; 221/203; 221/241; 221/258; 221/277

[58] Field of Search .................... 221/135, 200, 221/203, 239, 241, 258, 266, 277; 453/53, 57

[56] References Cited

U.S. PATENT DOCUMENTS

| | | | |
|---|---|---|---|
| 1,128,561 | 2/1915 | Webendorfer | 453/57 |
| 2,690,856 | 10/1954 | Trondte | 221/277 |
| 3,746,211 | 7/1973 | Burgess | 221/200 |
| 4,660,824 | 4/1987 | Hehnken et al. | 271/208 |
| 4,810,230 | 3/1989 | Shirasawa | 221/203 |
| 4,902,263 | 2/1990 | Ito et al. | 453/53 |
| 5,337,919 | 8/1994 | Spaulding et al. . | |

FOREIGN PATENT DOCUMENTS

| | | | |
|---|---|---|---|
| 0043743 | 3/1984 | Japan | 271/145 |

*Primary Examiner*—H. Grant Skaggs
*Attorney, Agent, or Firm*—Hovey, Williams, Timmons & Collins

[57] ABSTRACT

A medicament dispensing cell for use in an automatic dispensing machine includes a housing defining a medicament storage section, a discharge section leading to an outlet, a passage between the sections, a rotatable platen and a dispensing assembly for dispensing medicament in single file from the storage section to the discharge section. A resilient, flexible bushing having outwardly extending fingers encloses the hub of the platen for conveying medicament through the passage. The platen includes a plurality of spirally configured conveying members defined on the surface thereof and the dispensing assembly includes a selectively adjustable passage wall for adjusting the breadth of the passage.

22 Claims, 4 Drawing Sheets

MEDICAMENT DISPENSING CELL

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of automatic medicament dispensing machines. In particular, the invention is concerned with a medicament dispensing cell for use in an automatic dispensing machine.

2. Description ot the Prior Art

U.S. Pat. No. 5,337,919 discloses an automatic medicament dispensing machine having a plurality of dispensing cells for storing and dispensing various types of solid medicament units such as pills, capsules and caplets. Each cell includes a rotatable platen presenting a driven gear. A manipulator arm of the machine retrieves an empty vial and positions the vial adjacent the outlet of a selected dispensing cell. The manipulator arm includes a drive gear that engages the driven gear of the cell for selective rotation thereof in order to dispense medicament from the cell. The filled vial is then positioned on a discharge conveyor for subsequent handling such as labeling and inspection.

While generally adequate, the dispensing cell as disclosed in the '919 patent presents some problems. For example, medicament units sometimes cling to the housing of the cell or to one another due to static charge or moisture. Additionally, medicament units are sometimes dispensed without adequate spacing therebetween resulting in an inaccurate count by the photoelectric eye on the manipulator arm. Breaking and jamming of medicament units has also been a problem. All of these factors have contributed to a dispensing speed slower than that desired.

SUMMARY OF THE INVENTION

The present invention solves the prior art problems discussed above and provides a distinct advance in the state of the art. In particular, the dispensing cell hereof eliminates static charge problems and ensures reliable dispensing of medicament units with sufficient spacing for an accurate count.

The preferred dispensing cell for use in an automatic medicament dispensing machine includes the housing, a rotatable platen, and a dispensing assembly. The walls of the housing define a storage section, a discharge section leading to an outlet, and a passage therebetween. The platen is composed of conductive material for reducing static charge and presents a plurality of spirally configured conveying members extending outwardly from the hub thereof. A guide wall extends from the passage into the discharge section adjacent the periphery of the platen for guiding medicament units thereto.

The dispensing assembly includes a resilient, flexible bushing with outwardly extending fingers extending around the hub and a passage wall spaced from the bushing and defining the passage therebetween. The passage wall is shiftable to adjust the passage to a width greater than the breadth of a medicament unit but less than twice the breadth thereof for dispensing of medicament units into the discharge section in single file. Other preferred aspects of the present invention are disclosed herein.

DETAILED DESCRIPTION OF THE PREFERRED EMBODIMENT

Figure 1:
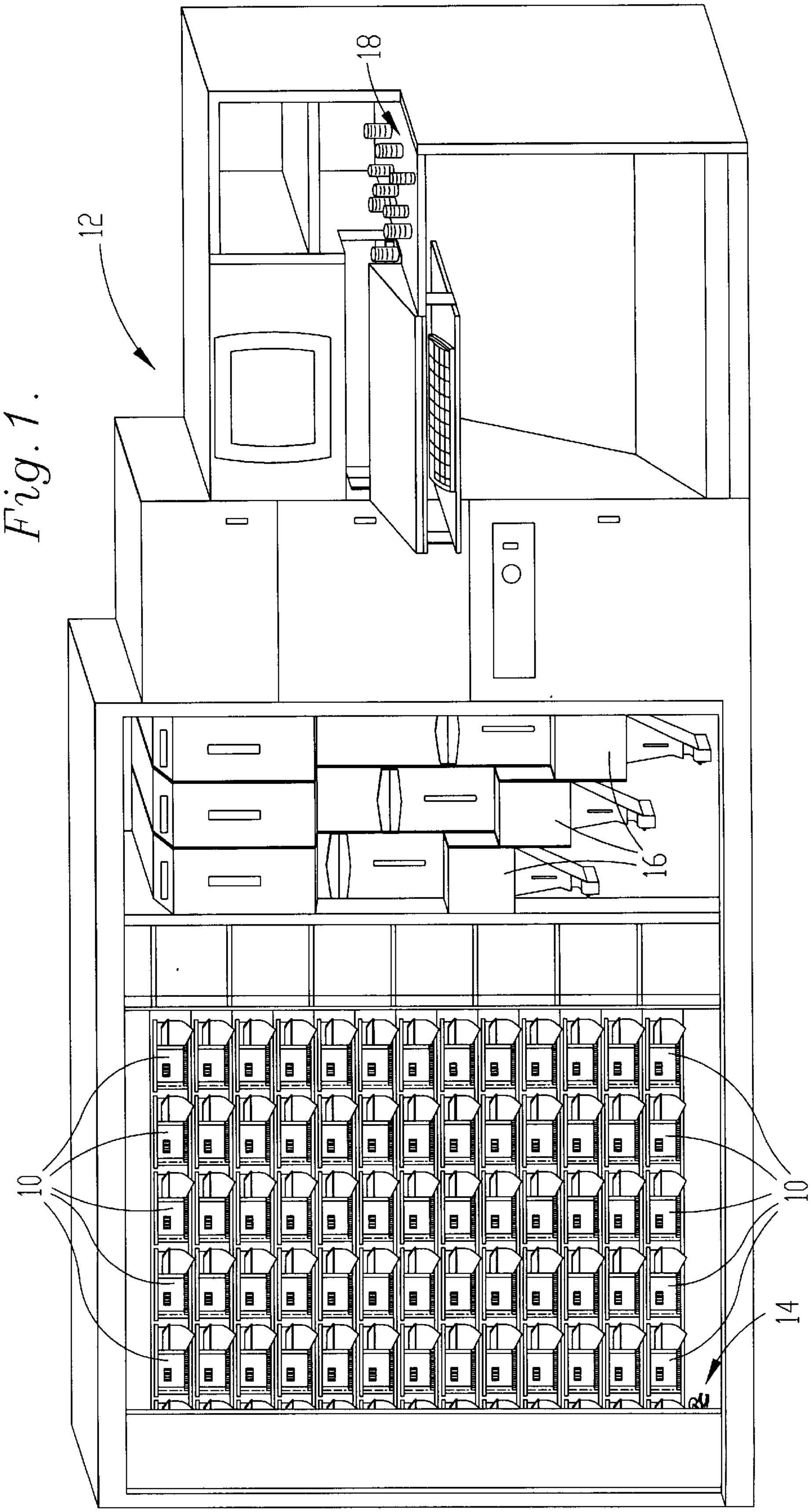
FIG. 1 is a pictorial view of a plurality of the preferred medicament dispensing cells in accordance with the present invention shown as part of an automatic medicament dispensing machine.
Figure 2:
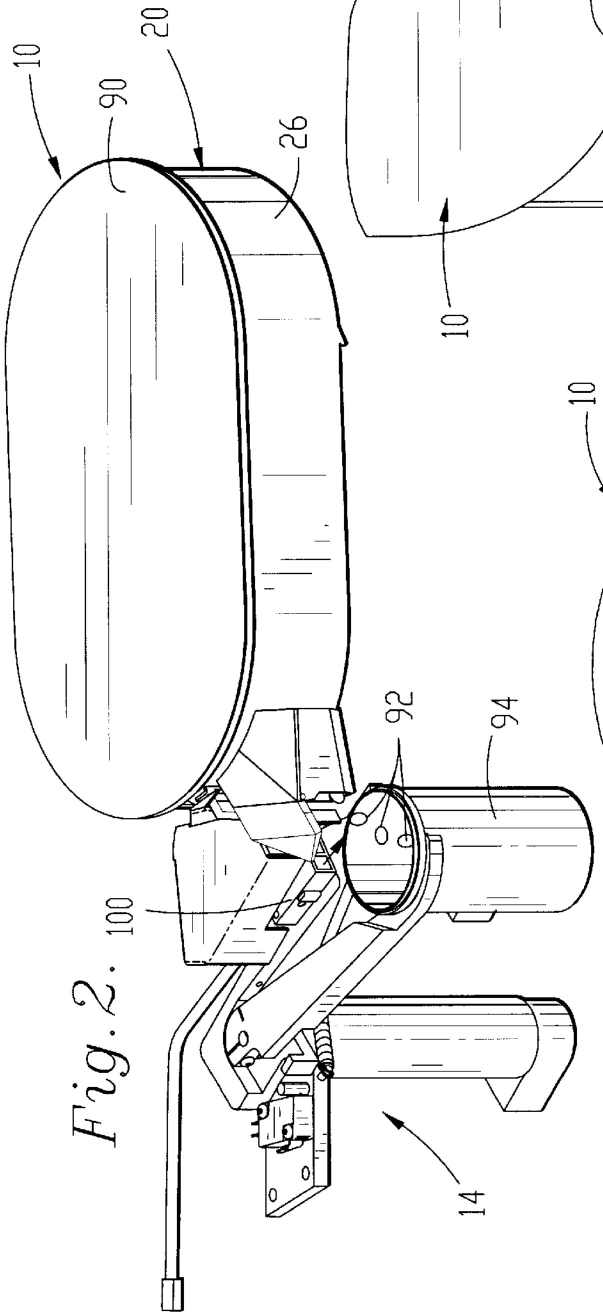
FIG. 2 is a left side pictorial view of a dispensing cell of FIG. 1 shown engaged by the vial manipulator mechanism of the dispensing machine of FIG. 1.
Figure 3:
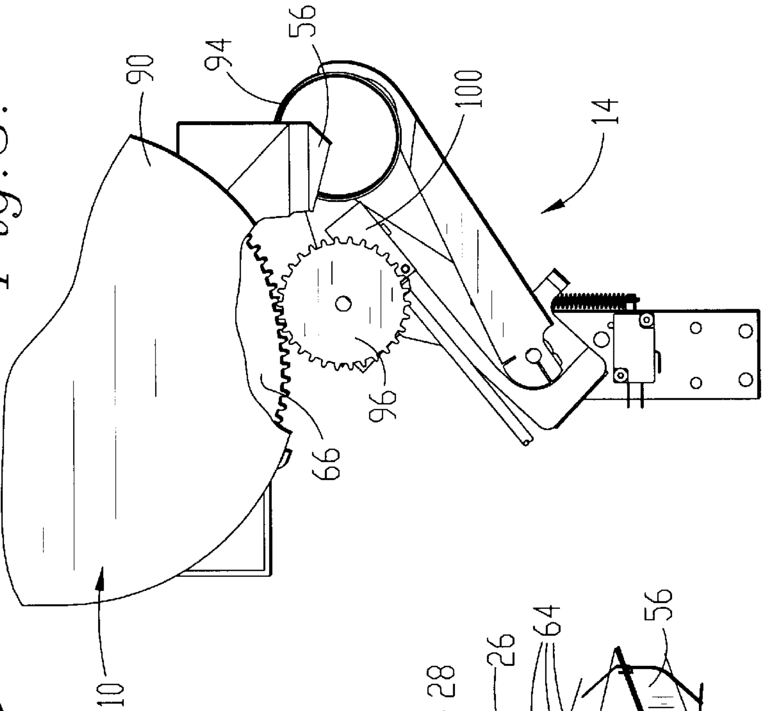
FIG. 3 is a left, top pictorial view of the cell and mechanism of FIG. 2 with portions cut away for clarity of illustration.
Figure 4:
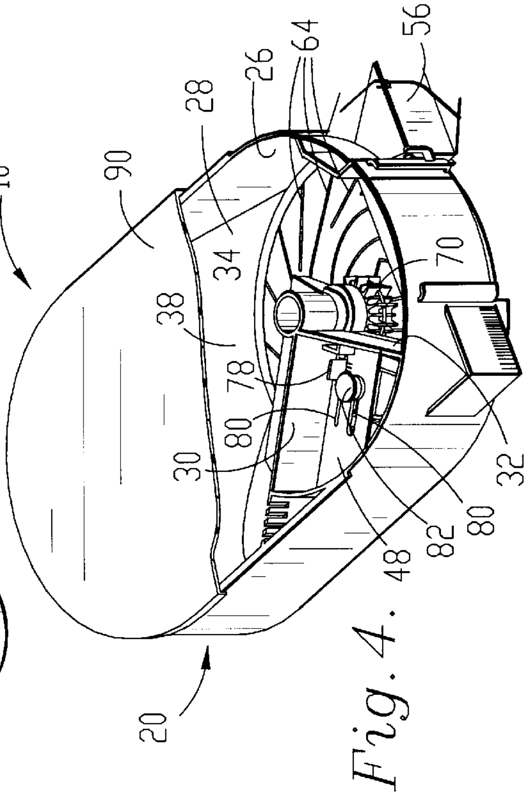
FIG. 4 is a right, front pictorial view of the dispensing cell of FIG. 1 with portions cut away for clarity of illustration.

FIG. 1 illustrates a plurality of preferred medicament dispensing cells 10 in accordance with the present invention shown in use as part of an automatic medicament dispensing machine 12 such as that disclosed in U.S. Pat. No. 5,337,919, incorporated by reference as part of the disclosure hereof. In general, machine 12 includes a manipulator mechanism 14 (see also FIGS. 2 and 3) that retrieves an empty vial from one of the vial dispensers 16, places the empty vial adjacent a selected dispensing cell 10 for receipt of medicament therefrom, and then places the filled vial on a conveyor for labeling and subsequent inspection at inspection station 18. Preferred dispensing cell 10 broadly includes housing 20, platen 22 and dispensing assembly 24.

Referring to FIGS. 2–10, housing 20 presents an elongated elliptical configuration and includes circumscribing side wall 26, sloped bottom wall 28, brace wall 30, guide wall 32 and central hub wall 34. Side wall 26 and bottom wall 28 define central opening 36 with platen 22 received therein. Side wall 26, bottom wall 28 and brace wall 30 define medicament storage section 38. Sloped cover wall 40 extends from brace wall 30 into storage section 38 and is spaced above platen 18 to define passage inlet 42.

Figure 5:
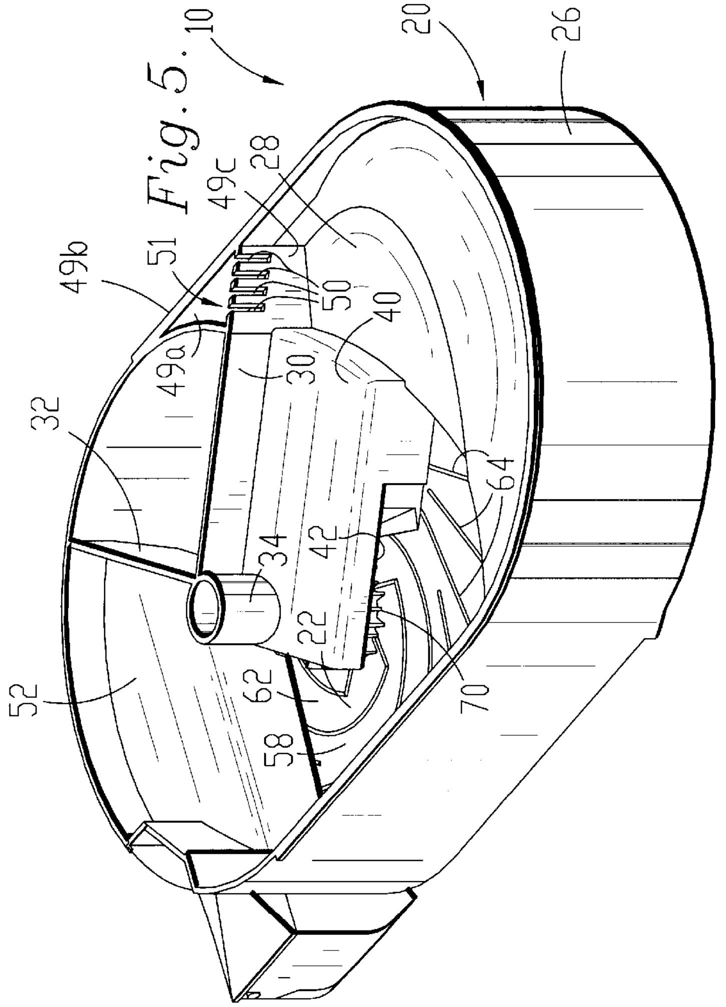
FIG. 5 is a left, rear pictorial view of the dispensing cell of FIG. 1 with the cover removed.
Figure 10:
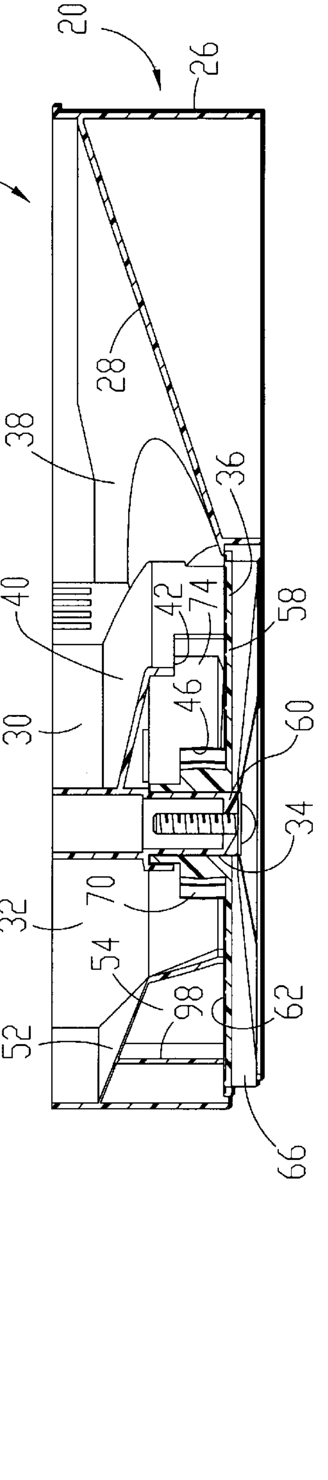
FIG. 10 is a sectional view taken along line 10—10 of FIG. 7.
Figure 8:
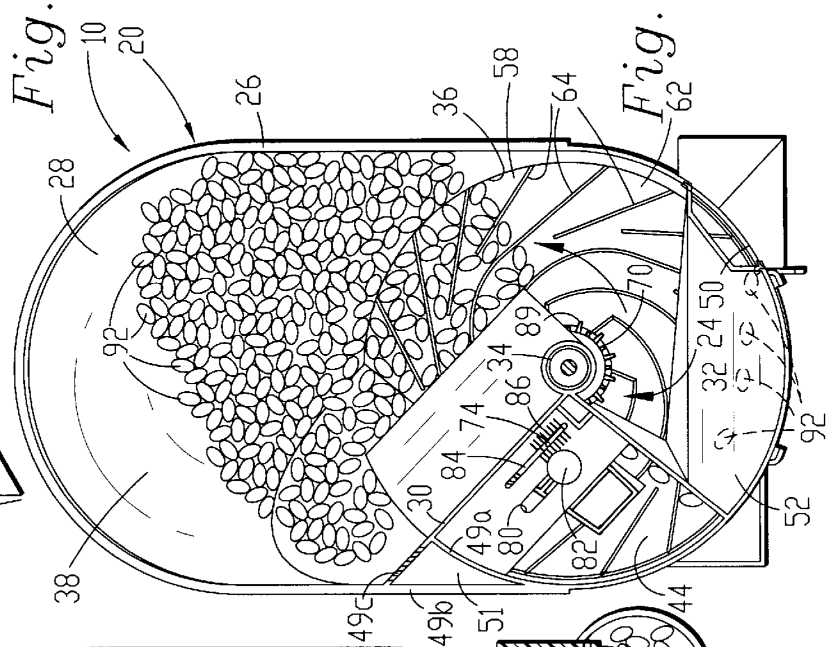
FIG. 8 is a top plan view of the dispensing cell of FIG. 1 with the cover removed.

Side wall 26, brace wall 28 and guide wall 32 define discharge section 44. Medicament passage 46 extends between storage section 38 and discharge section 44 under brace wall 30. Support wall 48 extends from brace wall 30 into discharge section 44 over passage 46 and between side wall 26 and guide wall 32. As best shown in FIGS. 5 and 8, side wall 26 also includes wall sections 49*a*, 49*b* and 49*c* defining chamber 51 configured for receiving desiccant packets therein in order to prevent moisture accumulation in cell 10. Wall section 49*c* includes a plurality of slots 50 defined therein for air exchange between the desiccant received in chamber 51 and storage section 38.

Housing 20 also includes outlet 50 with outlet wall 52 extending inwardly from side wall 26 to define outlet channel extending between discharge section 44 and outlet 50. Gate 56 is pivotally mounted adjacent outlet 50.

Platen 22 integrally includes disk-shaped platen body 58 and central hub 60 rotatably received in central hub wall 34. Platen body 50 presents upper surface 62 and includes a plurality of medicament conveying ribs 64 extending from the surface thereof configured in a generally spiral pattern extending from hub 60. The lower surface of platen body 58 is configured to present driven gear 66. Platen 22 is preferably composed of conductive material such as 899A69584 FS 23156 available from the RTP Company for reducing any static charge that might accumulate among the components of cell 10 and any medicament stored therein.

Dispensing assembly 24 includes dispensing structure 68 and bushing 70 positioned about platen central hub 60. Dispensing structure 68 includes passage wall 72 spaced from bushing 70 and spaced from guide wall 32, and includes funnel wall 74 extending into storage section 38 for funneling medicament therefrom into passage 46. Dispensing structure 68 also includes upstanding, threaded stud 76 and upstanding position-indicating tab 78. Stud 76 extends through stud slot 80 defined in support wall 48 and threadably receives thumbscrew 82. With thumbscrew 82 loose, dispensing structure 68 can be shifted to present a selected width for passage 46 and then retightened for holding structure 68 in the selected position.

Tab 78 extends through a corresponding tab slot 84 defined in support wall 48. A plurality of passage-width indicia 86 in the nature of spaced lines defined on support wall 48 adjacent tab slot 84 for indicating the position of tab 78 and thereby indicating the position of structure 68 and the width of passage 46.

Bushing 70 is preferably composed of flexible, resilient material such as KRATON or SANOPRENE thermal plastic elastomer and presents a plurality of outwardly extending fingers 88. The rotation of platen 18 and bushing 70 along with fingers 88 convey units of medicament from storage section 38 into passage 46.

Figure 9:
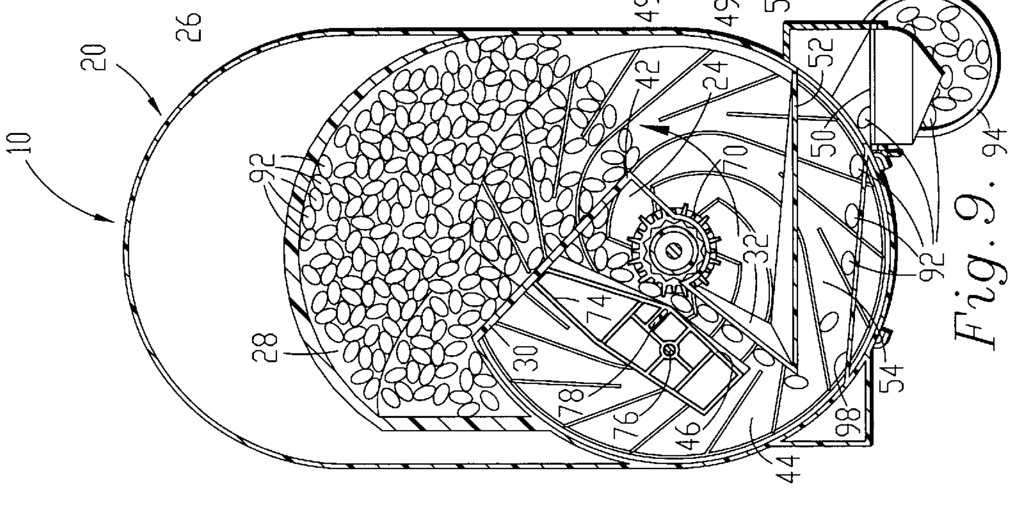
FIG. 9 is a sectional view taken along line 9—9 of FIG. 6.

In use, cover 90 is removed from housing 20. Storage section 38 is then filled with a selected medicament such as pills, capsules, or caplets 92 as illustrated in FIGS. 8 and 9. Sloped cover wall 40 supports the weight of the medicament units positioned above dispensing assembly 24 and provides a constant head of medicament units to the entrance of passage 46. This feature contributes to more reliable and accurate dispensing of medicament units and also aids in the prevention of jamming and breakage.

The width of passage 46 is then adjusted by loosening thumbscrew 82 and shifting dispensing structure 68 to a selected location as indicated by tab 78 and indicia 86 corresponding to the desired width of passage 46. Thumbscrew 82 is then retightened and cover 90 replaced.

It is preferred that dispensing structure 68 be adjusted so that units of medicament emerge from passage 46 substantially in single file. For example, caplet 92 presents a thickness, a length as the major axis, and a breadth as the minor axis. It is preferred that dispensing structure be adjusted so that the width of passage 46 is greater than the breadth of an individual medicament unit, but less than twice the breadth. With this spacing, a caplet 92 entering passage 46 with its length transverse thereto will be turned by bushing 70. Once aligned, the width of passage 46 is sufficient for unrestricted movement of caplets 92 but narrow enough to prevent the caplets from turning or wedging.

In the operation of dispensing cell 10 as part of dispensing machine 12, manipulator mechanism 14 presents an empty vial 94 below outlet 50. In this position, drive gear 96 of mechanism 14 engages driven gear 66 of platen body 58. Rotation of drive gear 92 causes rotation of platen 22 in the counter-clockwise direction as illustrated in FIGS. 8 and 9.

With rotation of platen 22, conveying ribs 64 sweep caplets 92 toward passage inlet 42 and along funnel wall 74 into passage 46. The configuration of funnel wall 74 gradually narrows the approach toward passage 46 which tends to align caplets 92 along the major axes thereof. As caplets 92 pass along funnel wall 74, bushing 70 engages, separates and moves caplets 92 into passage 46. The flexible and resilient nature of bushing 70 significantly contributes to the prevention of medicament breakage and jamming while helping propel medicament units through passage 46. As will be appreciated, round medicament such as pills need not be aligned axially, but bushing 70 aids in aligning the pills in single file and spacing them along passage 46. The resilient and flexible nature of bushing 70 provides for gentle handling of medicaments thereby minimizing breakage and abrasion.

The rotation of platen 22 moves caplets 92 through passage 46. The spiral orientation of conveying ribs 64 assists in this movement but also moves caplets 92 against guide wall 32. This helps maintain caplets 92 in a single file orientation. Additionally, ribs 64 prevent medicament units sliding or rolling on platen 18 without being propelled toward outlet 50. This is an important factor in preventing jamming of medicament units. Moreover, as caplets 92 move toward the periphery of platen 18, their velocities increase which further spaces caplets 92 from one another.

As caplets 92 emerge from passage 46 and pass beyond the end of guide wall 32, platen 22 carries them into outlet channel 54. The configuration of conveying ribs 64 sweeps the capsules toward the periphery of platen 22 until they engage channel wall 98. The rotation of platen 18 carries caplets 92 along channel wall 98 and maintains the spacing as caplets 92 are dispensed through outlet 50. In this way, caplets 92 are dispensed one at a time allowing the photoelectric eye 100 on manipulator mechanism 74 to achieve an accurate count.

Figure 6:
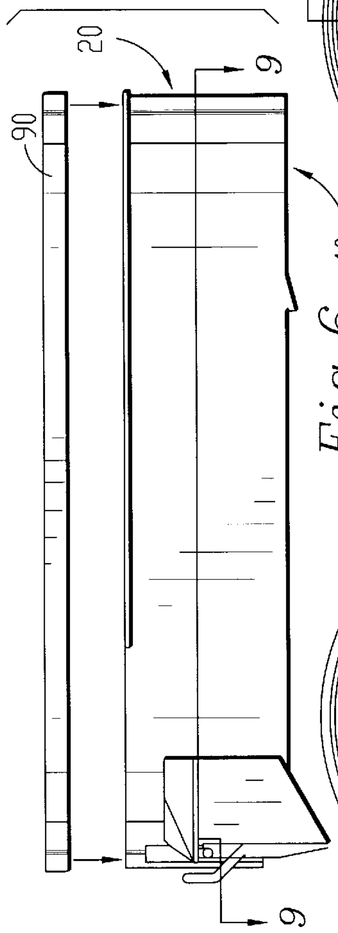
FIG. 6 is a left, elevational view of the dispensing cell of FIG. 1 showing the cover in spaced relationship.
Figure 7:
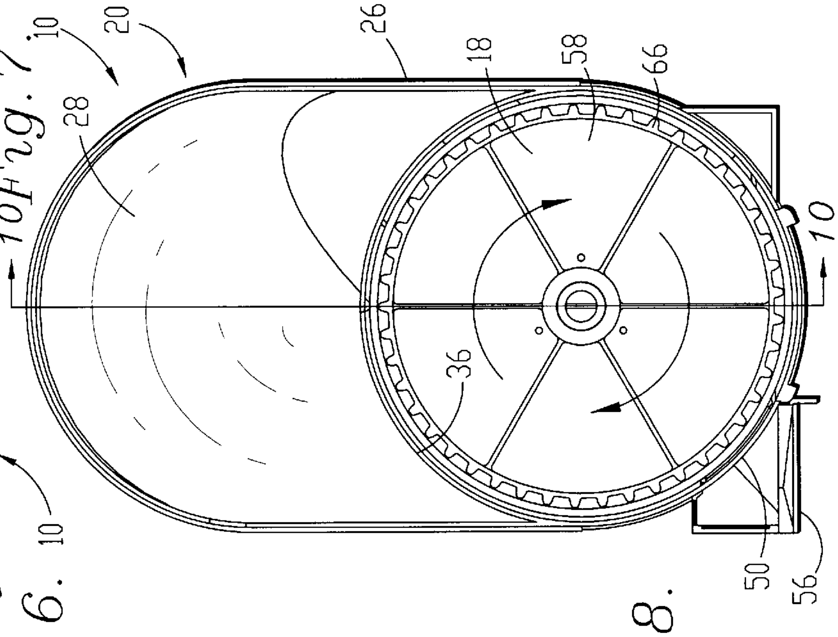
FIG. 7 is a bottom plan view of the dispensing cell of FIG. 1.

Turning to FIG. 6, housing 20 also includes tab 102 extending from the bottom thereof and configured for reception in a corresponding notch 104 defined in the support shelf 106 for dispensing cell 10. When a cell is installed in machine 12, notch 102 slides until it drops into notch 104 providing a positive indication that cell 10 is properly positioned.

As will now be appreciated, the present invention provides a distinct advance in the state of the art. The features discussed above effectively eliminate jamming and breakage of medicament units while, at the same time, ensuring dispensing of medicament units one at a time for increased accuracy. Moreover, with these advances, the rotational speed of platen 22 can be increased leading to faster dispensing of medicament units.

Those skilled in the art will appreciate that the present invention encompasses many variations in the preferred embodiment described herein. Having thus described the preferred embodiments of the present invention, the following is claimed as new and desired to be secured by Letters Patent:

We claim:

1. In an automatic medicament dispensing machine, a dispensing cell for dispensing units of medicament comprising;

a housing having walls defining a storage section, a discharge section leading to an outlet, and a passage between said sections, rotatable platen means forming at least a portion of the bottom wall of said sections and passage for conveying medicament units during rotation of said platen means from said storage section to said outlet by way of said passage and discharge section, the dispensing machine having means for selectively rotating said platen means, and dispensing means positioned in said passage defining the side-to-side width thereof as greater than the breadth of a medicament unit and less than twice the breadth thereof for dispensing medicament units from said storage section to said discharge section, said platen means including a disk-shaped platen having a hub, said housing including a guide wall extending from said passage adjacent said hub into said discharge section and terminating adjacent the periphery of said platen for guiding medicament units thereto for conveyance to said outlet, said dispensing means including a passage wall spaced from said hub and defining said passage therebetween, and including a resilient, flexible bushing surrounding said hub having a plurality of outwardly extending fingers positioned for engaging and conveying medicament units through said passage during rotation of said platen.

2. The dispensing cell as set forth in claim 1, said dispensing means further including a funnel wall extending from said passage wall into said storage section and positioned for funneling medicament units into said passage.

3. The dispensing cell as set forth in claim 1, said dispensing means including adjusting means for selectively adjusting the side-to-side position of said passage wall in order to adjust the width of said passage.

4. The dispensing cell as set forth in claim 3, said adjusting means including means shiftably mounting said passage wall with said housing and means for selectively holding said passage wall in a selected position.

5. The dispensing cell as set forth in claim 4, said dispensing means further including an indicator extending therefrom for shifting therewith and extending to a position adjacent indicia configured on said housing, said indicator and indicia cooperatively indicating the position of said passage wall and thereby the width of said passage.

6. The dispensing cell as set forth in claim 1, said dispensing cell being subject to static charge causing medicament units to cling to said housing walls, said platen means being composed of conductive material for reducing said static charge.

7. The dispensing cell as set forth in claim 1, said housing including chamber walls defining a chamber configured for receiving a desiccant packet therein.

8. The dispensing cell as set forth in claim 7, said chamber being positioned adjacent said storage section, said chamber walls including slots defined therein for air exchange with said storage section.

9. In an automatic medicament dispensing machine, a dispensing cell for dispensing units of medicament comprising:

a housing having walls defining a storage section, a discharge section leading to an outlet, and a passage between said sections;

rotatable platen means forming at least a portion of the bottom wall of said sections and passage for conveying medicament units during rotation of said platen means from said storage section to said outlet by way of said passage and discharge section, the dispensing machine having means for selectively rotating said platen means; and dispensing means positioned in said passage defining the side-to-side width thereof as greater than the breadth of a medicament unit and less than twice the breadth thereof for dispensing medicament units from said storage section to said discharge section;

said platen means including a disk-shaped platen having a hub and presenting an upper surface having a plurality of spirally arranged conveying members defined thereon extending from said hub and configured for spacing medicament units in said discharge section during rotation of said platen.

10. The dispensing cell as set forth in claim 9, said housing including a guide wall extending from said passage adjacent said hub into said discharge section and terminating adjacent the periphery of said platen for guiding medicament units thereto for conveyance to said outlet.

11. The dispensing cell as set forth in claim 9, said dispensing means including a passage wall spaced from said hub and defining said passage therebetween.

12. The dispensing cell as set forth in claim 11, said dispensing means including a resilient, flexible bushing surrounding said hub having a plurality of outwardly extending fingers positioned for engaging and conveying medicament units through said passage during rotation of said platen.

13. In an automatic medicament dispensing machine, a dispensing cell for dispensing units of medicament comprising:

a housing having walls defining a storage section, a discharge section leading to an outlet, and a passage between said sections, rotatable platen means forming at least a portion of the bottom wall of said sections and passage for conveying medicament units during rotation of said platen means from said storage section to said outlet by way of said passage and discharge section, the dispensing machine having means for selectively rotating said platen means, and dispensing means positioned in said passage defining the side-to-side width thereof as greater than the breadth of a medicament unit and less than twice the breadth thereof for dispensing medicament units from said storage section to said discharge section, said housing including a guide wall extending from said passage opposite said dispensing means into said discharge section and terminating adjacent the periphery of said platen for guiding medicament units thereto for conveyance to said outlet, said platen means including a disk-shaped platen having a hub and presenting an upper surface having a plurality of spirally arranged conveying members defined thereon extending from said hub and configured for spacing medicament units in said discharge section during rotation of said platen, said platen being composed of conductive material for reducing static charge between said cell and medicament units, said dispensing means including a passage wall extending along the side of said passage, a funnel wall extending from said passage wall into said storage section and positioned for funneling medicament units into said passage, a resilient, flexible bushing surrounding said hub and having a plurality of outwardly extending fingers positioned for engaging and conveying medicament units through said passage wall and bushing defining said passage therebetween, adjusting means for selectively adjusting the side-to-side position of said passage wall relative to said bushing in order to adjust the width of said passage including means shiftably mounting said passage wall to said housing and means for releasably holding said passage wall in a selected position, and an indicator extending from said passage wall for shifting therewith and extending to a position adjacent indicia configured on said housing, said indicator and indicia cooperatively indicating the position said passage wall and thereby the width of said passage.

14. In an automatic medicament dispensing machine, a dispensing cell for dispensing units of medicament comprising:

a housing having walls defining a storage section, a discharge section leading to an outlet, and a passage between said sections;

rotatable platen means forming at least a portion of the bottom wall of said sections and passage for conveying medicament units during rotation of said platen means from said storage section to said outlet by way of said passage and discharge section, the dispensing machine having means for selectively rotating said platen means; and dispensing means for dispensing medicament units from said storage section to said discharge section;

said platen means including a disk-shaped platen having a hub and presenting an upper surface having a plurality of spirally arranged conveying members defined thereon extending from said hub and configured for spacing medicament units in said discharge section during rotation of said platen.

15. The dispensing cell as set forth in claim 14, said dispensing means being positioned in said passage and defining the side-to-side width thereof as greater than the breadth of a medicament unit and less than twice the breadth thereof for dispensing medicament units from said storage section to said discharge section.

16. The dispensing cell as set forth in claim 14, said housing including a guide wall extending from said passage adjacent said hub into said discharge section and terminating adjacent the periphery of said platen for guiding medicament units thereto for conveyance to said outlet.

17. The dispensing cell as set forth in claim 14, with said dispensing means including a passage wall spaced from said hub and defining said passage therebetween.

18. The dispensing cell as set forth in claim 17, said dispensing means including adjusting means for selectively adjusting the side-to-side position of said passage wall in order to adjust the width of said passage.

19. The dispensing cell as set forth in claim 14, with said dispensing means including a resilient, flexible bushing surrounding said hub and having a plurality of outwardly extending fingers positioned for engaging and conveying medicament units through said passage during rotation of said platen.

20. The dispensing cell as set forth in claim 14, said dispensing cell being subject to static charge causing medicament units to cling to said housing walls, said platen means being composed of conductive material for reducing said static charge.

21. The dispensing cell as set forth in claim 14, said housing including chamber walls defining a chamber positioned adjacent said storage section configured for receiving a desiccant packet therein, said chamber walls including slots defined therein for air exchange with said storage section.

22. In an automatic medicament dispensing machine, a dispensing cell for dispensing units of medicament comprising:

a housing having walls defining a storage section, a discharge section leading to an outlet, and a passage between said sections;

rotatable platen means forming at least a portion of the bottom wall of said sections and passage for conveying medicament units during rotation of said platen means from said storage section to said outlet by way of said passage and discharge section, the dispensing machine having means for selectively rotating said platen means; and dispensing means for dispensing medicament units from said storage section to said discharge section;

said platen means including a disk-shaped platen having a hub and presenting an upper surface;

said dispensing means including a resilient, flexible bushing surrounding said hub and having a plurality of outwardly extending fingers positioned for engaging and conveying medicament units through said passage during rotation of said platen.

* * * * *